May 3, 1932.  E. A. CAPOCEFALO  1,856,154
CUTTING MACHINE
Filed Feb. 16, 1931
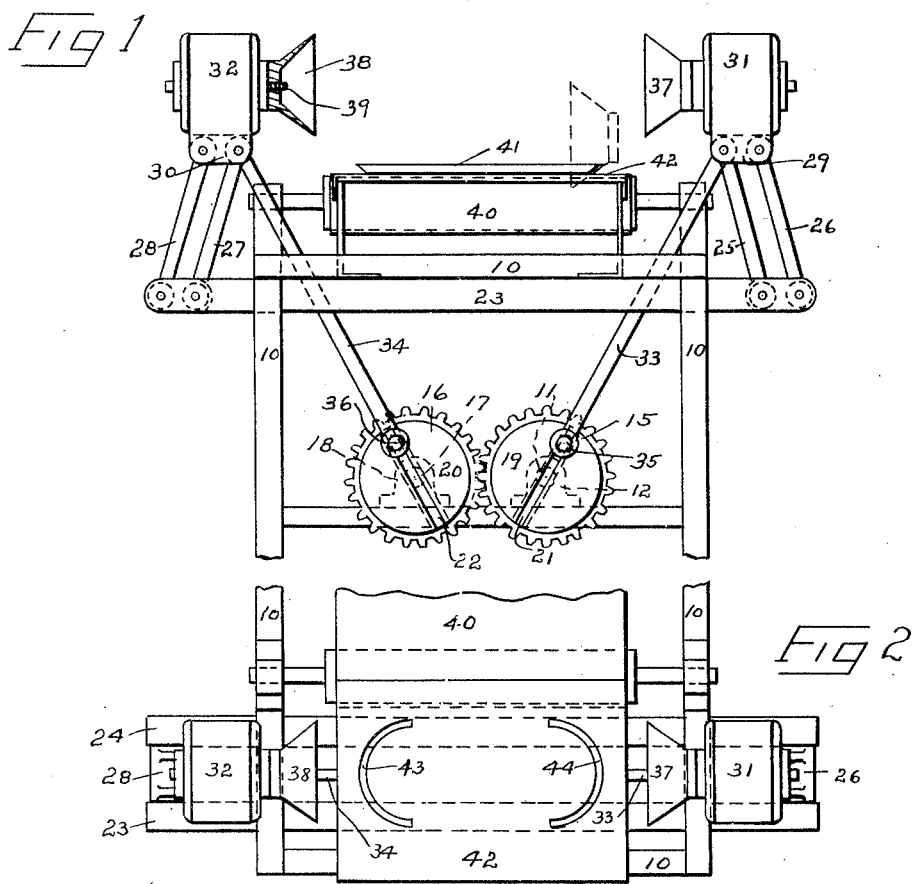
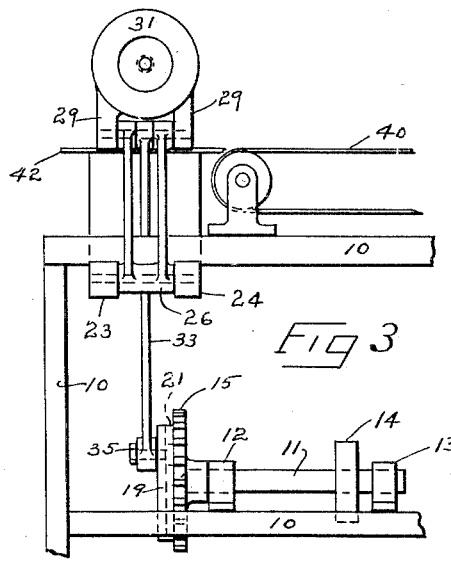
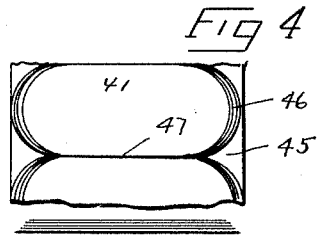
Inventor
Edward A. Capocefalo
By his Attorney
Henrik J. Schmidt Patented May 3, 1932

1,856,154

UNITED STATES PATENT OFFICE

EDWARD A. CAPOCEFALO, OF SYRACUSE, NEW YORK, ASSIGNOR TO STERILEK COMPANY, INC., OF BROOKLYN, NEW YORK, A CORPORATION OF NEW YORK

CUTTING MACHINE

Application filed February 16, 1931. Serial No. 515,908.

My invention relates to machines for trimming the ends or corners of certain materials, as for example fillers for sanitary napkins. It has for its main object to provide a machine of simple design which will in a practical manner trim or cut materials otherwise difficult to operate on. Another object is to provide a machine which, while complete in itself, may be used as an attachment on other machines, as for example the positive feeding device, shown and described in my co-pending application Serial No. 434,436 filed March 8th, 1930.

These and other objects and advantages will be readily understood from the following description and from the accompanying drawings of a preferred embodiment, but it will be noted that various modifications might be made without departing from the scope of the invention. In the drawings Fig. 1 is an end view of the cutting machine, Fig. 2 a plan view, Fig. 3 a side elevation, Fig. 4 a plan view of a piece of material cut on the machine, and Fig. 5 a side view of Fig. 4.

Referring now to Figs. 1, 2 and 3, 10 is fragments of the frame structure of the machine. A main shaft 11 rotates in bearings 12 and 13 and is supplied with a pulley 14 to which power is applied to operate the machine. A gear 15 is secured on the end of shaft 11 and drives another gear 16 secured on the end of a shaft 17 which rotates in bearings 18. The front faces of these gears are constructed as disc cranks 19 and 20 and provided with diametrical T slots 21 and 22.

Two cross bars 23 and 24 are secured transversely to the length of the frame structure 10. Between each of the ends of these bars two double-armed rocking links 25, 26, 27 and 28 are connected. The upper ends of these links are pivotally connected to links 29 and 30 cast on the high speed, electric motors 31 and 32. A connecting rod 33 is connected between the lug 29 and the disc crank 19. Another connecting rod 34 is connected between the lug 30 and the disc crank 20. The connecting rods are secured to the disc cranks by T bolts 35 and 36 which engage in the T slots 21 and 22. It will thus be seen that by sliding these bolts in the slots the strokes of the cranks may be adjusted to various lengths.

Cupped, knife-edged, conical shaped cutters 37 and 38 are mounted on the threaded spindles 39 formed on the end of the motor shafts. The shape and construction of one of these cutters is plainly shown in the cross-section of cutter 38 on Fig. 1. A conveyor belt 40 feeds the material 41 to the table 42 which is provided with semicircular slots 43 and 44 into which the cutters descend.

The machine operates in this manner: The material, a trimmed and cut fragment of which is shown bottom side up in Figs. 4 and 5, is conveyed to the table 42 by the belt 40. This belt has an intermittent motion. As the main shaft is rotated the gears 15 and 16 rotate in opposite directions causing the motors 31 and 32 with the cutters 37 and 38 to be drawn downwardly and inwardly. As the cutters, which rotate at high speed, engage the material they remove the portion marked 45, leaving the edges scalloped and chamfered as shown at 46. The material is later cut on the lines 47.

While I have illustrated and described the process of cutting fillers for sanitary napkins, it will be understood that I do not wish to limit the machine to such use only.

Having described my invention and its operation, what I claim as new and wish to protect by Letters Patent is:

1. In a cutting machine of the class described; a cutting table; one or more cupped, conical, knife-edged cutters mounted horizontally above said table; means for rotating said cutters; and means for moving the cutters downwardly and axially while maintaining them in horizontal position.

2. In a cutting machine of the class described; a cutting table; one or more cupped, conical, knife-edged cutters mounted horizontally above said table; means for rotating said cutters; means for moving the cutters downwardly and axially while maintaining them in horizontal position; and means for altering the lengths of these movements.

3. In a cutting machine of the class described; a cutting table; one or more pairs of cupped, conical, knife-edged cutters mounted horizontally opposite each other above said table; independent means for rotating each of said cutters; means for moving the cutters downwardly and axially while maintaining them in horizontal position; and means for regulating the lengths of these movements.

4. In a cutting machine of the class described; a cutting table; one or more pairs of cupped, conical, knife-edged cutters mounted horizontally opposite each other above said table; independent means for rotating each of said cutters; means for simultaneously moving each pair of cutters downwardly and axially while maintaining them in a horizontal position; and means for regulating the lengths of these movements.

EDWARD A. CAPOCEFALO.